United States Patent [19]
Evans

[11] Patent Number: 5,656,865
[45] Date of Patent: Aug. 12, 1997

[54] WIND CONVERSION UNIT HAVING CUP SHAPED FLOW THROUGH BLADES AND A CENTRIFUGAL SPEED REGULATOR

[76] Inventor: Franklin T. Evans, 1011 Hunter St., Apt. #E4, Baltimore, Md. 21202-3849

[21] Appl. No.: 531,054

[22] Filed: Sep. 20, 1995

[51] Int. Cl.$^6$ .............................. F03D 9/00; F03D 11/02; F16F 15/16
[52] U.S. Cl. ...................... 290/55; 416/197 A; 74/573 F
[58] Field of Search ..................... 290/55, 44; 415/54.1, 415/57.4; 416/41, 50, 52, 92, 197 A, 200 R, 243, 223 B, 23, 62, 90 R, 212 R; 74/573 F

[56] References Cited

U.S. PATENT DOCUMENTS

| | | | |
|---|---|---|---|
| 196,448 | 10/1877 | Harris | 416/120 |
| 1,200,308 | 10/1916 | Bunnell | 415/211.1 |
| 2,252,788 | 8/1941 | Sparr | 416/197 R |
| 2,518,611 | 8/1950 | Geiger | 416/197 R |
| 3,812,724 | 5/1974 | Curtz et al. | 73/458 |
| 3,970,409 | 7/1976 | Luchuk | 416/145 |
| 4,005,947 | 2/1977 | Norton et al. | 416/197 A |
| 4,079,264 | 3/1978 | Cohen | 290/55 |
| 4,320,304 | 3/1982 | Karlsson et al. | 290/55 |
| 4,321,005 | 3/1982 | Black | 415/4.2 |
| 4,362,470 | 12/1982 | Locastro et al. | 416/197 A |
| 4,398,096 | 8/1983 | Faurholtz | 290/55 |
| 4,543,836 | 10/1985 | Call | 73/861.85 |

FOREIGN PATENT DOCUMENTS 2535404  5/1984  France.

*Primary Examiner*—Steven L. Stephan
*Assistant Examiner*—Christopher Cuneo
*Attorney, Agent, or Firm*—Sixbey, Friedman, Leedom & Ferguson

[57] ABSTRACT

A wind conversion unit is provided with a central shaft having one or more channels extending through the shaft perpendicular to the longitudinal axis thereof. A blade unit having a spoon shaped blade with a concave face is secured at opposite ends of each channel to direct airflow through the channel and receive airflow from the channel. The concave faces of the blades on opposite sides of the shaft are oppositely oriented so that the concave face of one blade receives an airstream, directs the airstream through the restricted channel which then impinges the airstream on the concave face of the opposite blade. A velocity modulator driven by the shaft applies centrifugal force and gravity to a flowable material to compensate for changes in airflow velocity and force.

23 Claims, 2 Drawing Sheets

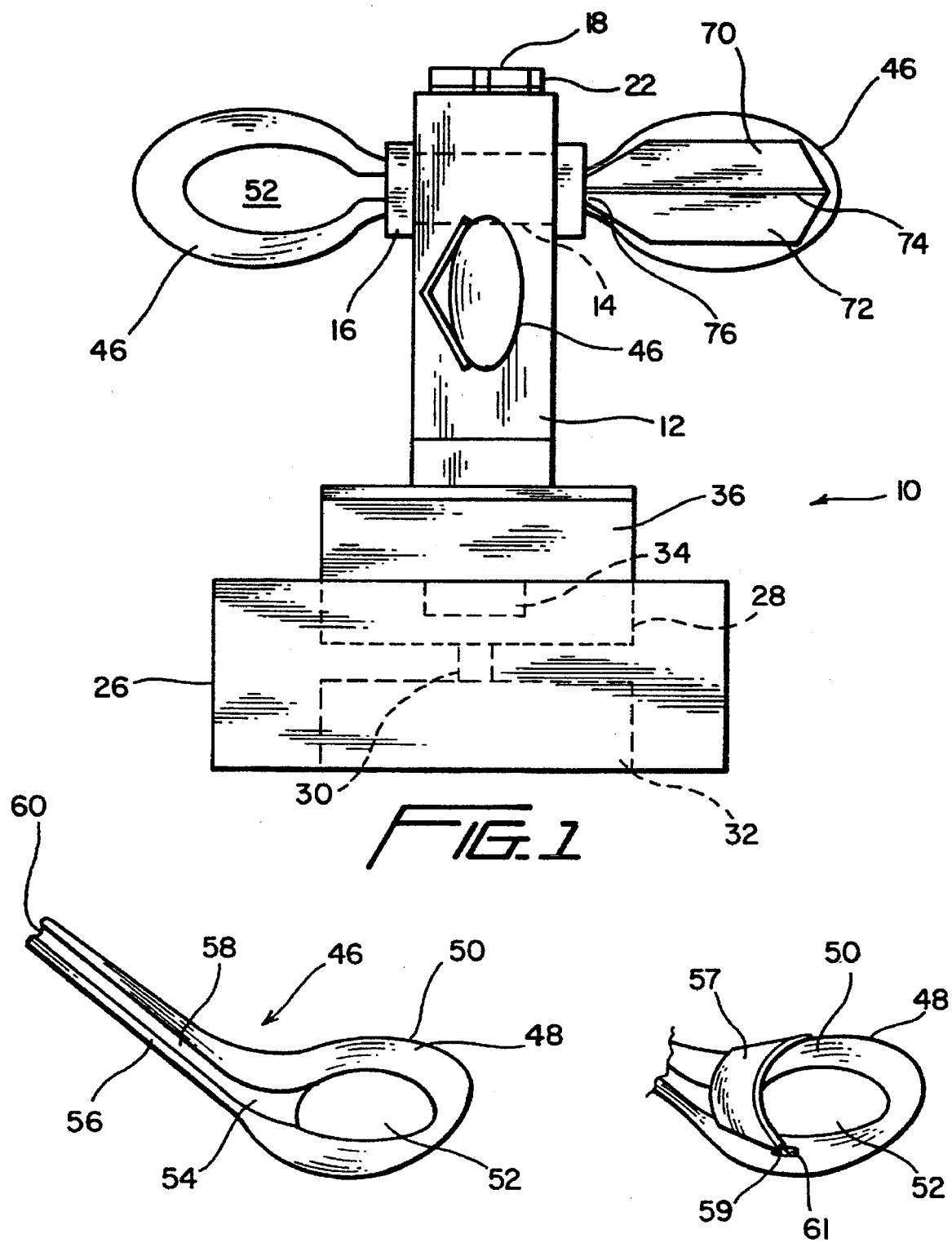

WIND CONVERSION UNIT HAVING CUP SHAPED FLOW THROUGH BLADES AND A CENTRIFUGAL SPEED REGULATOR

TECHNICAL FIELD

The present invention relates generally to an apparatus for converting energy derived from air flow and more particularly to an improved wind conversion unit for effectively recovering kinetic energy from wind velocity.

BACKGROUND OF THE INVENTION

For centuries, the windmill has been the basic unit for converting wind energy into other forms of energy needed to accomplish useful work. In recent years, significant amounts of money and design effort have been spent to improve the efficiency and economy of wind conversion units. Generally, the result has been the development of large, nonportable devices which require relatively high wind speeds for the economical conversion of wind energy to other forms of energy.

Little attention has been given to the development of moderately sized wind conversion units designed for portability and easy assembly and disassembly. Such units should be light weight and compact for storage and to facilitate mobility, and should be sized for use in isolated locations or mobile facilities. In smaller sizes, the wind conversion unit should be suitable for science demonstration kits or toys.

To effectively drive a moderate to small sized wind conversion unit, it is necessary to maximize the effect of an airstream on the unit, as the air driven blades for the unit will have a limited surface area. In large fluid operated rotors, wind directed against one rotor has been redirected to provide additive torque to a rotor. U.S. Pat. No. 4,005,947 to Norton et al. shows a device of this type where wind is used to exert a forward pressure on one side of a rotor and a reverse pressure on the opposite side. However, if the size of the Norton et al. device was significantly reduced, the wind effect creating the reverse pressure on the opposite side of the rotor would be reduced and much less effective since the volume and speed would drop with the reduction in size.

DISCLOSURE OF THE INVENTION

It is a primary object of the present invention to provide a novel and improved wind conversion unit which is lightweight, compact and which may be easily assembled and disassembled with larger components nestable for compact storage and mobility.

Another object of the present invention is to provide a novel and improved wind conversion unit which concentrates and inverts the thrust of an airstream on one side of a vertical axis so that it augments the torque produced by the direct action of the airstream on the contralateral side of the vertical axis.

A further object of the present invention is to provide a novel and improved wind conversion unit provided with coaxial blade units having oppositely directed concave faces which divert an airstream from one concave face to a contralateral concave face to produce synchronous torque on both sides of the virtual axis of a vertical shaft. The blade units include a funnel shaped intermediate section leading into a hollow stem of reduced combined cross section to funnel the airstream impinging on the concave face of one blade unit so that a concentrated airstream of increased speed is directed against the concave face of an opposed, coaxial blade unit.

Yet another object of the present invention is to provide a novel and improved wind conversion unit which includes a rotatable velocity and force modulator which dampens the effects of sudden changes in the speed of an airflow, minimizes the force required to initiate or accelerate rotation of the unit at low airflow speeds, maximizes the force required to accelerate rotation of the unit at high airflow speeds and which conserves energy developed during high airflow speeds.

A still further object of the present invention is to provide a novel and improved velocity modulator for a wind conversion unit having a fluid mass stored in a central reservoir which is driven by centrifugal force into circumferential pockets above the reservoir and which passes by gravity back to the reservoir in response to decreases in the speed of rotation of the modulator.

These and other objects of the present invention are accomplished by providing a vertical axis wind conversion device which inverts the thrust of the wind on one side of an axis of rotation, so as to augment the torque produced by direct action of the wind on the opposite side. The device contains a cylindrical shaft equipped at one end with a coupling connector for attachment to a rotatable base support, and with a connector at the other end for possible attachment of additional units (stacked). The cylindrical shaft has transverse conduits spaced along its length arrayed at 90 or 120 degrees with respect to each other. Spoon shaped blades serve as the wind collectors, the hollow stems of which are inserted into the conduits in the shaft. Each shaft conduit houses two blades at opposite ends oriented in opposite directions. The stems of the blades mate in the conduit to form a passage of reduced cross section to concentrate the airflow and augment velocity as wind collected by the wider blade face is "funnelled" into the narrower portion leading to the stem passage of reduced cross-sectional area, and then strikes the opposite blade face to augment the torque produced by direct action of the wind on that face. The action of the wind as it is concentrated results in force upon the medial portion of the initial collecting blade which increases on a per square inch basis and reduces the "cut-in" speed of the ambient wind. Deflectors can be added to each blade on the back side or convex side to divert wind from the body of the blade and reduce drag. A velocity modulator is provided between the cylindrical shaft and the base support to dampen the effects of sudden changes in airflow.

BRIEF DESCRIPTION OF THE DRAWINGS

FIG. 1 is a view in front elevation of the wind conversion unit of the present invention;

FIG. 2 is a perspective view of a blade unit for the wind conversion unit of FIG. 1;

FIG. 3 is a perspective view of a shrouded blade unit 4 for the wind conversion unit of FIG. 1;

DESCRIPTION OF THE PREFERRED EMBODIMENTS

Figure 4:
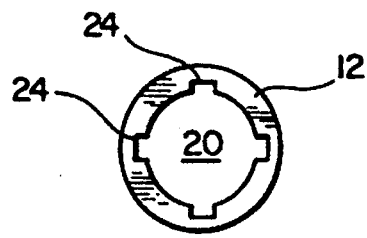
FIG. 4 is a plan view of a portion of a coupling for the wind conversion unit of FIG. 1.

Referring now to the drawings, the wind conversion unit of the present invention indicated generally at 10 includes a vertical shaft section 12 having vertically spaced channels extending completely therethrough, one of which is shown in broken lines at 14. Normally, adjacent channels will extend perpendicular to one another, but if the shaft section 12 is of sufficient length, additional channels can be provided at other than 90 degree angles (i.e., 60 degrees, 120 degrees, etc.) so long as the angles between channels are equal and the channels divide the 360 degree periphery of the shaft section into equal segments. The open ends of each channel may open into an annular collar 16 which is secured to the shaft section.

Although one shaft section 12 is shown in FIG. 1, the wind conversion unit may include a plurality of stacked, identical shaft sections to increase the height of the unit. To facilitate the use of a plurality of shaft sections, each section includes a projection 18 at one end and an opening 20 at the opposite end (FIG. 4) to receive and mate with the projection 18 on an adjacent shaft section. The projection 18 includes laterally extending lugs 22 which fit into slots 24 in the end of a mating shaft section to preclude relative rotation between the shaft sections. Thus shaft sections which have been disassembled for transportation or storage can be quickly and easily assembled for use.

The shaft sections 12 can be directly connected to an electric generator assembly 26 or other conversion unit for converting rotation into another form of energy. Using the generator assembly 26 as an example, the conversion unit includes a rotary base shown in broken lines at 28 mounted to rotate on the shaft 30 of a conventional electrical generator 32. The generator 32 may be any conventional small generator for converting a rotary input to an electrical output to charge batteries or power small electrical lights or other small electrical units. The rotary base 28 includes an opening 34 which is identical to the opening 20 and which includes the slots 24 to engage the lugs 22 on one end of a shaft section 12.

Figures 6, 7:
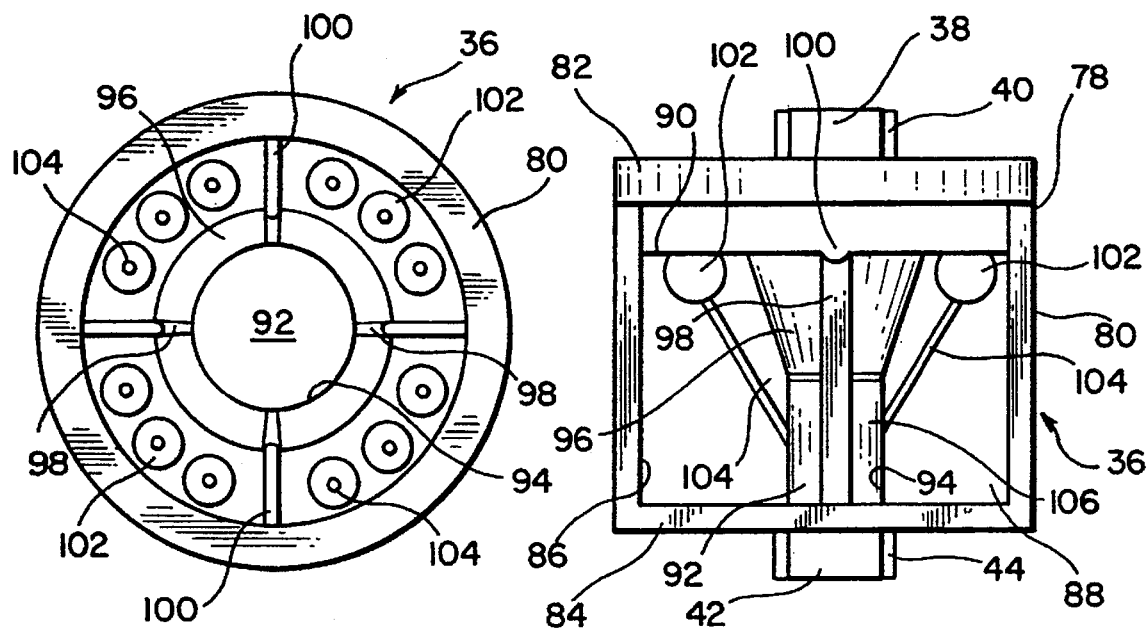
FIG. 6 is a sectional plan view of a velocity modulator for the wind conversion unit of FIG. 1.
FIG. 7 is a sectional view of the velocity modulator of FIG. 6.

Although the shaft section 12 can be directly connected to the rotary base 28, it is preferably connected to a velocity modulator 36 which is mounted to rotate with the rotary base 28. This velocity modulator, as shown in FIG. 7, includes an upper projection 38 with lateral lugs 40 which conforms to the projection 18 and lugs 22, so that the upper projection can mate with the opening 20 and slots 24 of a shaft section 14. The velocity modulator also includes a lower projection 42 with lateral lugs 44 which mate with the opening 34 in the rotary base 28. Thus the velocity modulator can be easily assembled and disassembled with the generator assembly 26 and a shaft section 12.

The wind conversion unit 10 is powered by mating, spoon shaped blades 46 which operate as a thrust inverting wind scoop to divert a flow of air from one concave face to a contralateral concave face to produce synchronous torque on both sides of the vertical axis of the shaft section 12. Additionally, the spoon shaped blades funnel the air flow so that wind speed is increased by sacrificing area of wind stream cross section. Wind power is thereby increased according to the formula:

$$P = \frac{\rho A V^3}{2}$$

where $\rho = \frac{\text{Mass Density of Air}}{2}$

A = Cross Sectional Area
V = Velocity of Windstream

The spoon shaped blades 46 may be molded from plastic or other lightweight moldable material and are identically configured so that they may be stacked for storage. Each spoon shaped blade has the general configuration of a large oriental rice spoon with a bowl section 48 having sides 50 which ideally curve down to a flat bottom 52, although curved bottoms or bottoms of other configurations are possible. At one end of the bottom, the bowl narrows to an angled funnel configuration at 54 leading into a stem 56 which is U shaped in cross section. Opposed sides of the stem define a U shaped channel 58 extending from the narrow end of the angled funnel 54 to an open end 60 at the free end of the stem. The bowl section 48 extends at an angle within a range of from 110° to 130° to the longitudinal axis of the channel 14 and the stem, but the angled funnel configuration at 54 curves smoothly from the flat bottom 52 into the channel 58.

Figure 5:
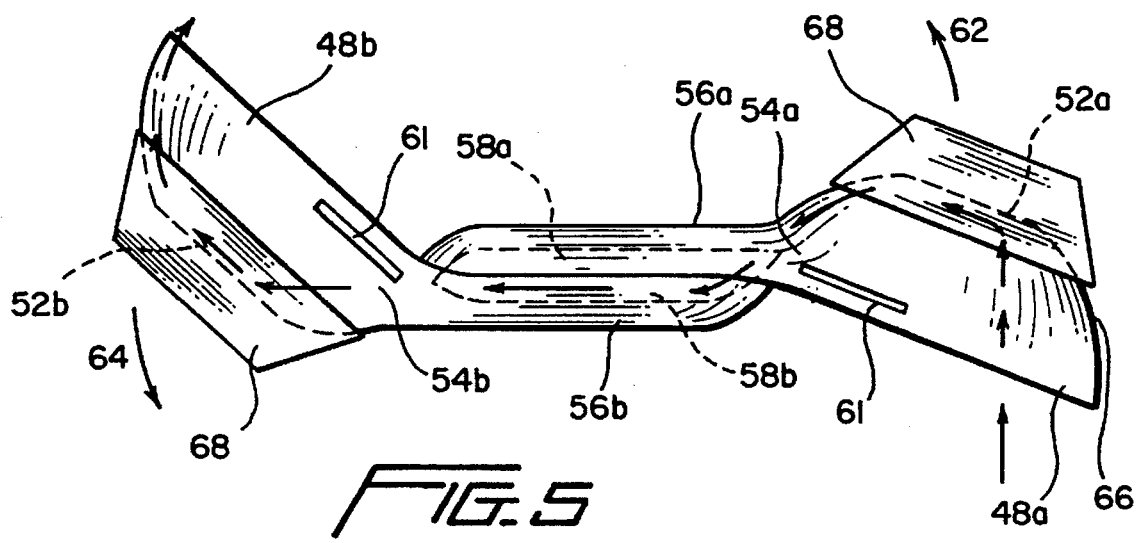
FIG. 5 is a view in side elevation of engaged, opposed, coaxial blade units for the wind conversion unit of FIG. 1.

To assemble the blades 46 with the shaft section 12, the stems 56 are inserted into opposite ends of a channel 14 through the annular collars 16. The stems 56a and 56b are engaged as shown in FIG. 5 so that the U shaped channel 58a of the top stem overlies the U shaped channel 58b of the bottom stem to create an enclosed passage communicating between the bowl sections 48a and 48b on opposite sides of the shaft section. As shown by the arrows in FIG. 5, a windstream which engages the flat bottom 52a of the bowl section 48a drives the bowl section 48a in the direction of the arrow 62. Some of this windstream is turned to the left in FIG. 5, and flows along the bottom 52a and converges as it passes through the funnel configuration 54a into the closed passage formed by the channels 58a and 58b. In the closed passage, the windstream picks up speed before it passes out through the funnel configuration 54b and engages the bottom 52b to drive the bowl section 48b in the direction of the arrow 64. The gentle rounded curves of the funnel configuration 54 minimize windstream turbulence as the windstream from a blade 46 converges for passage through the channels 58a and 58b.

Concentration (and augmented velocity) occurs as wind from the wider bowl section 48a funnels into the narrower funnel 54 leading to the stem 56a, so that its force upon the medial portion of the initial collecting bowl section increases on a per square inch basis. This concentration/ acceleration reduces the "cut-in" speed of the ambient wind. Thus, winds of 8–10 mph might effectively propel a device that otherwise would require 12–15 mph minimum.

Since 10 mph is the most common windspeed, and 13 mph the average (See FIG. 111, p. 115, Eldridge, F. R. WIND MACHINES, 2nd edition, Van Nostrand Reinhold Co. New York, 1980), this reduction in cut-in speed allows the wind conversion unit to tap a large source of wind energy that otherwise defies harvest; and at sites not otherwise productive of usable wind energy.

As shown by FIG. 3, it is sometimes advantageous to attach a curved shroud 57 to each blade 46 over the funnel configuration 54. This shroud can be in the form of a "U" shaped plastic piece having an inwardly extending lip 59 along each straight edge thereof which snaps into a groove 61 on either side of the blade. The shroud acts to retain wind at the concave face of the blade as it approaches the stem.

To reduce drag on the back or convex face 66 of the bowl sections of the blades 46, angled deflectors 68 may be formed integrally with the blades or attached thereto to deflect wind outwardly away from the back face of the blade as the blade rotates to increase the drag differential between paired blades. Each deflector may include two sections 70 and 72 which angle downwardly and outwardly from a central apex 74. Separate deflectors can taper down to a deflector stem 76 which is inserted with the blade stem 56 into a channel 14. By using separate deflectors, both the deflectors and the blades 48 can, be stacked to save space. Alternatively, the deflector can be an integral cone shape molded on the flat back surface of the bowl sections 48.

Fluctuations in wind speed, namely, its tendency to rise and fall in velocity and force, all the while tending to gust more or less erratically, present characteristic and chronic problems and impose significant burdens on mechanical and electrical generating equipment driven by a wind conversion unit. To significantly compensate for these fluctuations, the velocity modulator 36 is included in the wind conversion unit 10. This velocity modulator includes a closed container 78 which is cylindrical in shape and includes a cylindrical sidewall 80, a removable top 82 which supports the upper projection 38, and a bottom wall 84 which supports the lower projection 42. The sidewall, bottom wall and top define an inner chamber 86 which supports an internal unit 88 having a top surface 90 spaced below the top of the container 78. The internal unit 88 defines a central reservoir 92 having a cylindrical wall section 94 which extends approximately halfway up the internal unit, and then inclines outwardly at 96 to the top surface 90 of the internal unit. The inclined section 96 is provided with fluid receiving channels 98 which angle outwardly and upwardly from the bottom wall 84 at the bottom of the cylindrical section 94 of the central reservoir 92 to radial channels 100 formed in the top surface 90. The fluid receiving channels 98 are shown as open channels, but could constitute closed channels with inlet openings adjacent to the bottom wall 84.

Between each of the radial channels 100 are an equal number of equally spaced, open top pockets or chambers 102 positioned concentrically and peripherally around the reservoir 92 which extend below the top surface 90. Joining the bottom of each of these chambers 102 to the cylindrical section 94 of the reservoir 92 is an inclined, restricted passage 104. The passages 104 open into the cylindrical section 94 about midway of the cylindrical section.

In the operation of the velocity modulator 36, the cylindrical section 94 of the reservoir 92 contains a fluid mass or some solid state material which flows like a fluid, such as sand, small pellets, or a combination of a liquid and solid state material indicated at 106.

At high rotational speed, the entire fluid mass 106 is driven by centrifugal force from the cylindrical section 94 through the channels 98 and 100 into the peripheral chambers 102 where its mass increases the force of rotation while impeding acceleration of rotation. At lesser speeds, and especially at rest, the fluid mass is pulled by gravity back through the restricted passages 104 into the central cylindrical section 94, thus increasing the velocity of rotation while reducing the force required to accelerate rotation.

The peripheral chambers 102 are structurally above the lower reach of the central cylindrical section 94. Thus fluid movement outward and upward is propelled primarily by centrifugal force; movement inward and downward is propelled by gravity and inhibited to various degrees by centrifugal force. The entire volume of the fluid may be contained within the lower cylindrical section 94 or within the collective volume of the peripheral chambers 102. The net effects of the fluid's movements back and forth are:

a. to dampen effects of sudden changes in wind speed.

b. to minimize force required to initiate or accelerate rotation at low speed.

c. to maximize force required to accelerate rotation at high speed.

d. to conserve some of the energy invested in the mass of fluid rotating in the peripheral chambers 102.

At low speeds, the fluid mass is centrally contained in the cylindrical section 94 of the reservoir 92, and does not significantly affect the force required to rotate the velocity modulator. As the force of an airstream and thus the speed of rotation increases, centrifugal force moves the fluid mass upwardly and radially outwardly from the reservoir into the pockets or chambers 102. To create this centrifugal action, more force is required to rotate the velocity modulator, so the effects of high airstream gusts are dampened. Once the fluid mass has been transferred by centrifugal force, if the airstream velocity drops, the movement of the fluid mass down the inclined, restricted passages or conduits 104 tends to provide a force to augment the rotational force provided by the airstream.

The wind conversion unit 10 is a simple, lightweight portable unit which can be easily manufactured in a number of sizes. The components are quickly and easily assembled and disassembled and may be stacked for compact portability and storage.

I claim:

1. A wind conversion unit adapted to be powered by an airstream comprising a base, a central shaft mounted for rotation on said base, at least one enclosed channel extending through said shaft substantially perpendicular to the longitudinal axis thereof having a first open end and a second open end, a first blade unit mounted on said central shaft at the first open end of said channel and a second blade unit mounted on said central shaft at the second open end of said channel, said first and second blade units each including a blade having a sidewall and a back wall forming a concave face for receiving the airstream, said first and second blade units being mounted with the concave faces of said blades thereof being oriented in opposite directions, the side and back walls of the blades for said first and second blade units being formed to include a wide section to receive an airstream which will act on said blade unit to rotate said shaft, a narrow section of less width than said wide section to direct said airstream through said channel or to receive an airstream from said channel and an intermediate section which curves outwardly from said narrow section to said wide section.

2. The wind conversion unit of claim 1 wherein the wide sections of said blades extend outwardly from said shaft at an angle to the longitudinal axis of said channel and the narrow sections of said blades extend substantially parallel to the longitudinal axis of said channel whereby an airstream impinging on the concave face of one blade at one end of said channel is compressed to pass through said channel and impinge on the concave face of the blade at the opposite end of said channel.

3. The wind conversion unit of claim 2 wherein said blades extend at angles within the range of from 110 degrees to 130 degrees to the longitudinal axis of said channel.

4. A wind conversion unit adapted to be powered by an airstream comprising a base, a central shaft mounted for rotation on said base, at least one open ended channel extending through said shaft substantially perpendicular to the longitudinal axis thereof having a first open end and a second open end, a first blade unit mounted on said central shaft at the first open end of said channel and a second blade unit mounted on said central shaft at the second open end of said channel, said first and second blade units each including a blade having a sidewall and a back wall forming a concave face for receiving the airstream, said first and second blade units being mounted with the concave faces of said blades thereof being oriented in opposite directions, the side and back walls of the blades for said first and second blade units being formed to include a wide section with said concave face to receive an airstream which will act on said blade unit to rotate said shaft, a narrow section of less width than said wide section to direct said airstream through said channel or to receive an airstream from said channel and an intermediate section which curves outwardly from said narrow section to said wide section, each blade unit including an elongate stem forming said narrow section of said blade integral with the intermediate section of said blade having an arcuate central stem channel open at the top extending to the intermediate section, the stem of said first blade unit and the stem of said second blade unit being shaped to engage within the channel of said shaft whereby the arcuate central stem channels are closed to form a single passageway through said shaft channel for an airstream.

5. The wind conversion unit of claim 4 wherein the wide section each blade extends at an angle to the central longitudinal axis of the stem extending integrally therefrom.

6. The wind conversion unit of claim 5 wherein the back wall of the concave face of each said blade is flat, the sidewall of each said blade curving outwardly from one side of said flat back wall.

7. The wind conversion unit of claim 5 wherein the central stem channel of the stem formed integrally with each blade is formed to receive an airstream from or to direct an airstream against the concave face of said blade.

8. The wind conversion unit of claim 7 wherein said blades are formed to be stackable and nestable.

9. A wind conversion unit adapted to be powered by an airstream comprising a base, a central shaft mounted for rotation on said base, at least one open ended channel extending through said shaft substantially perpendicular to the longitudinal axis thereof having a first open end and a second open end, a first blade unit mounted on said central shaft at the first open end of said channel and a second blade unit mounted on said central shaft at the second open end of said channel, said first and second blade units each including a blade having a sidewall and a back wall forming a concave face for receiving the airstream, said first and second blade units being mounted with the concave faces of said blades thereof being oriented in opposite directions, the side and back walls of the blades for said first and second blade units being formed to include a wide section to receive an airstream which will act on said blade unit to rotate said shaft, a narrow section of less width than said wide section to direct said airstream through said channel or to receive an airstream from said channel and an intermediate section which curves outwardly from said narrow section to said wide section, the narrow section for each blade unit including an elongate stem integral with the blade having an arcuate central stem channel open at the top extending to the intermediate section, the central stem channel for each blade being formed to receive an airstream from or to direct an airstream against the concave face of said blade, the stem of said first blade unit and the stem of said second blade unit being shaped to engage within the channel of said shaft whereby the arcuate central stem channels are closed to form a single passageway through said shaft channel for an airstream, each blade extending at an angle to the central longitudinal axis of the stem extending integrally therefrom, and a deflector positioned adjacent to the surface of the back wall of each said blade which is opposite to the concave face of said blade, said deflector operating to deflect air away from the back wall.

10. The wind conversion unit of claim 9 wherein said deflector includes an apex spaced from the back wall of said blade and deflector sidewalls angling outwardly from the apex toward the back wall of said blade.

11. The wind conversion unit of claim 10 wherein said deflector includes a deflector stem extending outwardly from one end thereof, said deflector stem being formed to be inserted with the stem of said blade into the channel in said shaft.

12. The wind conversion unit of claim 9 wherein said deflector is formed integrally with said blade.

13. The wind conversion unit of claim 11 wherein said blade units and said deflectors are removably mounted in the channel of said shaft, said blade units and said deflectors being formed to be stackable and nestable.

14. The wind conversion unit of claim 7 wherein each blade extends at an angle within a range of from 110 to 130 degrees to the longitudinal axis of the central stem channel.

15. The wind conversion unit of claim 7 wherein said shaft includes a plurality of parallel channels extending therethrough with a blade unit mounted in the open ends of each such channel, said channels being spaced equal distances apart along the longitudinal axis of said shaft and each channel extending angularly relative to the remaining channels, the angles between the channels being equal.

16. The wind conversion unit of claim 2 which includes a velocity modulator connected to rotate with said shaft, said velocity modulator including a central reservoir containing a material flowable in response to gravity and centrifugal force, a top surface spaced above said central reservoir and extending radially outward therefrom, a funnel shaped wall forming a top section of said central reservoir and inclining outwardly to said top wall, equally spaced, material receiving pockets formed circumferentially in said top surface, and a restricted conduit extending from each such pocket to said central reservoir to return material by gravity thereto.

17. The wind conversion unit of claim 16 wherein said pockets are formed to receive a volume of said material substantially equal to the volume of said material which said reservoir is formed to receive.

18. The wind conversion unit of claim 17 wherein equally spaced material flow channels are formed in said top surface between said pockets to extend radially outward from said funnel shaped wall, each of said material flow channels being connected at one end to a funnel flow channel formed in said funnel shaped wall which extends to the top of said reservoir.

19. The wind conversion unit of claim 16 wherein said base includes a rotatable support, said velocity modulator being mounted on said rotatable support and said shaft being removably mounted on said velocity modulator.

20. The wind conversion unit of claim 19 wherein said velocity modulator includes a first coupling member and a second coupling member extending outwardly along the central longitudinal axis of said central reservoir from opposite ends of said velocity modulator, said rotatable support including a third coupling member for releasably and drivingly engaging said first coupling member and said shaft including a fourth coupling member for releasably and drivingly engaging said second coupling member.

21. A velocity modulator for a wind conversion unit including a cylindrical container having a cylindrical sidewall, a bottom wall extending across one end of said sidewall and a top wall extending across the opposite end of said sidewall, a central cylindrical reservoir spaced from said sidewall and extending upwardly from said bottom wall toward the top wall of said container, said reservoir being formed to contain a volume of material flowable in response into gravity and centrifugal force, a top surface spaced from said top wall and spaced above said central reservoir and extending across said container to said sidewall, said top surface having a circular central opening therein of a diameter greater than the diameter of said central reservoir, a funnel shaped wall extending from the top of said central reservoir and inclining outwardly to said top surface to connect the central opening thereof with said central reservoir, equally spaced, open top material receiving pockets formed circumferentially in said top surface with the open tops thereof facing said top wall, and a restricted conduit extending from each such pocket to said reservoir to return said material thereto by gravity.

22. The velocity modulator of claim 21 wherein said pockets are formed to receive a volume of said material substantially equal to the volume of said material which said reservoir is formed to receive.

23. The velocity modulator of claim 22 wherein equally spaced material flow channels are formed in said top surface between said pockets to extend radially outward from said funnel shaped wall, each of said material flow channels being connected at one end to a funnel flow channel formed in said funnel shaped wall which extends to the top of said reservoir.

* * * * *